(12) United States Patent
Watanabe et al.

(10) Patent No.: US 6,462,872 B2
(45) Date of Patent: Oct. 8, 2002

(54) OPTICAL ISOLATOR

(75) Inventors: Toshiaki Watanabe; Toshihiko Ryuo, both of Annaka (JP)

(73) Assignee: Shin-Etsu Chemical Co., Ltd., Tokyo (JP)

(*) Notice: Subject to any disclaimer, the term of this patent is extended or adjusted under 35 U.S.C. 154(b) by 0 days.

(21) Appl. No.: 09/812,554

(22) Filed: Mar. 21, 2001

(65) Prior Publication Data

US 2001/0036010 A1 Nov. 1, 2001

(30) Foreign Application Priority Data

Mar. 22, 2000 (JP) ........................ 2000-080897
Mar. 27, 2000 (JP) ........................ 2000-086239

(51) Int. Cl.[7] .................... G02B 27/28; G02B 5/30
(52) U.S. Cl. ................. 359/484; 359/500; 372/703
(58) Field of Search .................. 359/483, 484, 359/494–497, 500; 385/11, 14; 372/703

(56) References Cited

U.S. PATENT DOCUMENTS 5,867,314 A * 2/1999 Ota et al. ................ 359/484
6,270,261 B1 * 8/2001 Kawano ................... 385/88

FOREIGN PATENT DOCUMENTS

JP    A 10-227996    8/1998

* cited by examiner

Primary Examiner—Cassandra Spyrou
Assistant Examiner—Alessandro V. Amari
(74) Attorney, Agent, or Firm—Oliff & Berridge, PLC (57) ABSTRACT

There is disclosed an optical isolator, wherein one surface of an optical element comprising at least one polarizer and at least one Faraday rotator is bonded and fixed to a substrate in which a height of an optical element bonded portion surface has a level difference from a height of a peripheral portion surface, and the optical isolator, wherein a rectangular parallelepiped optical element comprising at least one polarizer and at least one Faraday rotator, which are bonded in the face of each light-transmitting surface, is bonded and fixed with a bonding agent to the substrate while the Faraday rotator in the optical element is not bonded to the substrate. There is provided a reliable and low cost optical isolator that can bond and integrate an optical isolator element and permanent magnets on a substrate, can realize positional adjustment in assembly with high precision and high bonding strength, and can avoid bonding distortion for an optical element.

20 Claims, 3 Drawing Sheets

OPTICAL ISOLATOR

BACKGROUND OF THE INVENTION

1. Field of the Invention

The present invention relates to an optical isolator used for an optical communication, optical information processing, optical measurement and so forth.

2. Related Art

Optical isolators are used for optical amplifiers, semiconductor laser units and so forth.

These optical isolators comprise two of polarizers fixed to each other with a relative angle of about 45° via a Faraday rotator inserted between them, which has a Faraday rotation angle of about 45°. They have an effect for passing through light of the forward direction but shielding light of the reverse direction.

Recently, smaller size, large-scale production and lower cost of these optical isolators are strongly desired. Accordingly, an optical isolator, for example, as disclosed in Japanese Patent Laid-open Publication No. 10-227996, have been proposed as a measure for answering the aforementioned demands, and such an isolator has been extensively developed and utilized.

Figure 4:
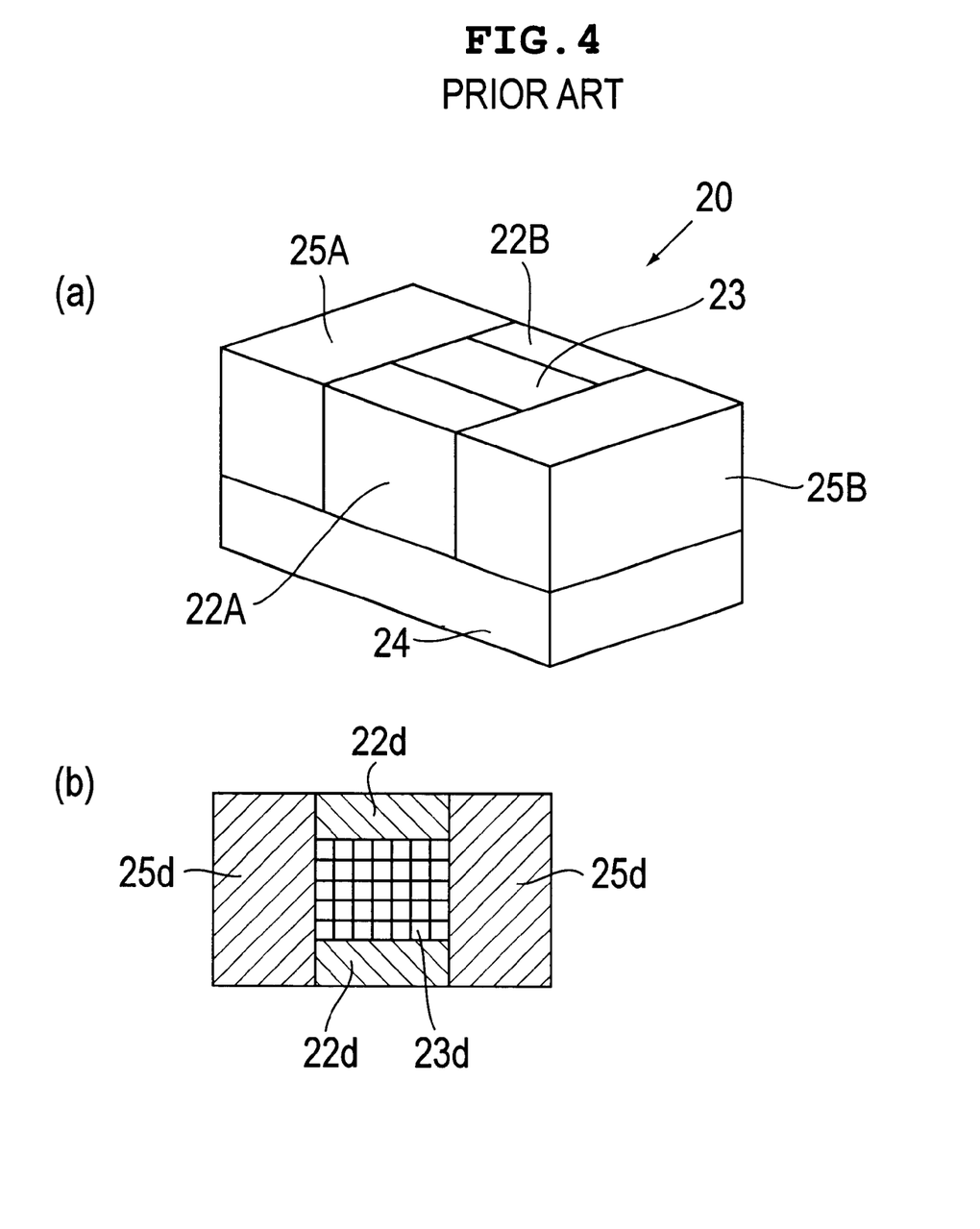
FIG. 4 includes explanatory views showing composed examples of conventional optical isolators that (a) is a perspective view and (b) is a sectional view, which shows a condition of a bonded surface for a substrate of an optical element and magnets.

As shown in FIG. 4(a), this optical isolator 20 comprises a rectangular parallelepiped optical element consisting of polarizers 22A and 22B and a Faraday rotator 23, and rectangular parallelepiped magnets 25A and 25B, and the element and magnets are bonded and fixed with an alloy solder, synthetic resin adhesive or the like on a tabular substrate 24. Further, FIG. 4(b) shows the case when the optical element and magnets are bonded with a bonding agent to the substrate, the bonded surfaces of both the element and magnets correspond to a whole area of the substrate surface. 22d represents each bonded surface of the polarizers, 23d represents the bonded surface of the Faraday rotator, and 25d represents each bonded surface of magnets.

Thus composed optical isolator seems to have advantages that it is easily positioned in a transmission polarizing direction when it is loaded inside an LD (laser diode) module, it can be loaded upon TEC (Thermoelectric Cooler), and it is easy to be downsized.

However, if both the optical element and magnets are disposed on one surface as described above, the following problems have occurred:

(1) Since both an optical element and magnets are bonded to one surface, magnetic fields of magnets in both sides affect the optical element (in terms of the attraction or repulsion), and thereby the optical element disposed in the center is distorted.

(2) Since magnetic field strength of a Faraday rotator disposed in each magnet end portion becomes lower contrary to that of the Faraday rotator disposed in each magnet center portion, the Faraday rotator can not obtain desired optical characteristics (of insertion losses in both a forward direction and reverse direction).

(3) It is difficult to position both an optical element and magnets.

(4) Desired optical characteristics can not be obtained due to the distortion generated when a rectangular parallelepiped optical element consisting of individual optical elements is bonded to a substrate.

(5) In order to avoid bonding distortion for an optical element, it has been known that the distortion can be relieved by previously bonding an optical element with a synthetic resin adhesive, especially silicone adhesive on a substrate. However, in this case, the sufficient strength for bonding between a substrate and optical element can not be obtained, and thereby there is a risk that the optical element is likely to be broken when it is handled.

SUMMARY OF THE INVENTION

Therefore, the present invention was accomplished in view of the aforementioned problems, and its object is to provide a reliable and low cost optical isolator that can bond and integrate an optical isolator element and permanent magnets on a substrate, can realize positional adjustment in assembly with high precision and high bonding strength, and can avoid bonding distortion for an optical element.

In order to solve the aforementioned problems, the present invention provides an optical isolator, wherein on one side of an optical element comprising at least one polarizer and at least one Faraday rotator, said optical element is bonded and fixed to a substrate in which a height of an optical element bonded portion suface has a level difference from a height of a peripheral portion surface.

As described above, if the optical isolator is bonded and fixed to a substrate in which the height of the optical element bonded portion surface has a level difference from the height of the peripheral portion surface, the distortion generated by a force due to absorption or repulsion affected by the magnet fields of the magnets, which is disposed on the peripheral portion of the substrate, for the optical element, which is disposed in the center of the substrate, can be relieved. Also, since the optical element can be disposed in the center of magnets in a height direction, a lack of the magnetic field strength for the Faraday rotator can be solved, and desired optical characteristics can be obtained. Further, by utilizing a level difference, there can be provided a reliable and low cost optical isolator that both the optical element and magnets can be positioned easily with high precision, and the optical element can be bonded and fixed with little adjustment.

Further, in order to solve the above-described problems, the present invention provides an optical isolator, wherein an optical element comprising at least one polarizer and at least one Faraday rotator, which are bonded to each light-transmitting surface, is bonded and fixed with a bonding agent to the substrate while the Faraday rotator in the optical element is not bonded to the substrate.

As described above, since only the Faraday rotator surface for the substrate in the optical element is not bonded to the substrate, the distortion for the optical element generated after it is bonded to the substrate can be solved, and desired optical characteristics can be obtained. Further, there can be provided with a reliable and low cost optical isolator that the optical element can realize positional adjustment with high precision, an can easily be bonded and fixed with sufficient high bonding strength.

In this case, a bond avoidance means can be provided so as not to be bonded the Faraday rotator in the optical element to the substrate.

According to the present invention, the optical isolator is suitable for being downsized and loaded inside an LD module. The present invention can provide a reliable and low cost optical isolator that a polarized surface of the optical element can be easily adjusted on a optimum position where its optical characteristics can be kept in good condition, the bonding strength for the substrate of the optical element is extremely high, and the optical isolator does not suffer a bonding stress, so that can obtain a large reverse direction insertion loss.

PREFERRED EMBODIMENTS OF THE INVENTION

Hereafter, embodiments of the present invention will be explained by referring to the appended drawings. However, the present invention is not limited thereto.

Figure 1:
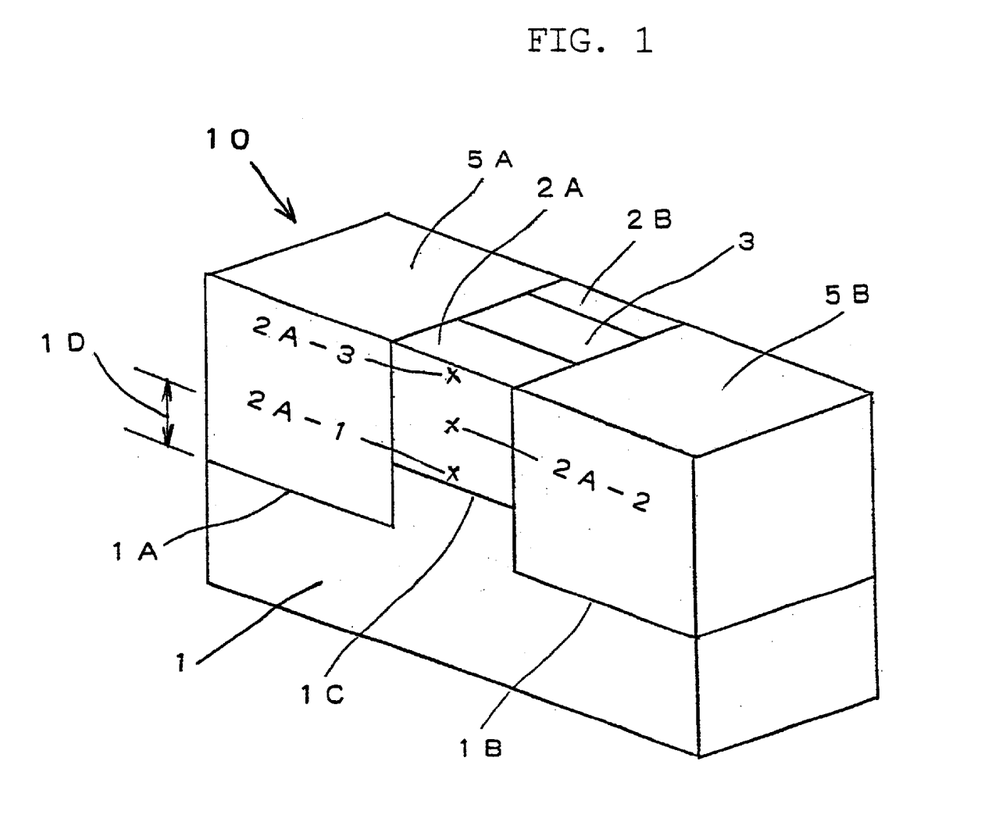
FIG. 1 is an explanatory view showing a composed example of an optical isolator according to the present invention.

FIG. 1 is an explanatory view showing a composed example of the optical isolator of the present invention.

The optical isolator 10 comprises two of polarizers 2A and 2B fixed to each other with a relative angel of about 45° via a Faraday rotator 3 inserted between them, which has a Faraday rotation angle of about 45°, and thereby an optical element is formed. This isolator has an effect for passing through light of the forward direction but shielding light of the reverse direction.

Further, the optical element is bonded and fixed to an optical element bonded surface 1C of a substrate 1 with a level difference 1D in the substrate center, and rectangular parallelepiped permanent magnets 5A and 5B are bonded and fixed to each magnet bonded surface 1A and 1B.

In this case, it is preferable that each section of the polarizers 2A and 2B and Faraday rotator 3 has a rectangular shape, especially square shape, the Faraday rotator 3 with a Faraday rotation angle of about 45° is clamped between two of the polarizers 2A and 2B to form the optical element, and it is bonded and fixed with a synthetic resin adhesive to a top surface of a level difference center in the substrate with a level difference. A single crystal plate such as a bismuth-substituted rare-earth iron garnet panel is commonly used for the Faraday rotator.

Further, for example, an Sm-Co permanent magnet is used for the magnets 5A and 5B, they are sintered and formed in rectangular parallelepiped, magnetized parallel with an optical axis, and bonded and fixed parallel with an optical axis to a peripheral portion of the level difference, which is located on a side of the Faraday rotator bonded to a top surface of the level difference, and thereby a desired optical isolator is formed. Furthermore, a resin adhesive such as an epoxy resin adhesive or silicone resin adhesive is also preferable to bond and fix magnets.

A level difference of the substrate with a level difference is formed by machining a stainless steel SUS304.

The optical isolator of the present invention according to the above-described composition can affect as follows.

First, since there is provided a level difference between magnet bonded portion surfaces and optical element bonded portion surface on the substrate, an optical element is disposed on the level difference formed in a substrate center, that is, it is clamped between magnets, and thereby magnets and optical element can be positioned very easy, and high machining precision for a level difference can realize the high positional precision. Further, a distortion for the optical element due to the affection of magnetic field strength generated after the optical element is bonded to the substrate can be solved.

Furthermore, since the optical element can be disposed on a magnet center in a height direction, a lack of magnetic field strength for the Faraday rotator can be solved.

Since magnets are bonded with an epoxy resin adhesive or silicone resin adhesive, and an optical element is bonded with a silicone resin adhesive especially, desired optical characteristics can be obtained while the bonding strength of the optical element is maintained, and a bonding distortion generated after the optical element is bonded to the substrate can be avoided.

In the case where the Faraday rotator is a latching type, a material having the same shape such as a metal component except a magnet can substitute as a strength reinforcement material for the permanent magnet, and thereby it can obtain the same strength reinforcement effect as the magnet.

Further, by utilizing a level difference in stead of a magnet, a component for reinforcing a bonding strength can be disposed on a magnet bonded portion surface and/or optical element bonded surface, so that the optical element can be prevented a bonding distortion.

Hereafter, the other embodiments of the present invention will be explained by referring to the appended drawings. However, the present invention is not limited thereto.

The present inventors have found that in order to prevent optical isolators from mechanical damage or distraction due to shock, drop or the like when they are handled, if a bonding agent with high bonding strength is used, a distortion is generated on an optical element, as the result, desired optical characteristics can not be obtained, and then a silicone resin adhesive, which can relieve a bonding distortion, is available to prevent optical characteristics from degrading. However, since the high bonding strength can not be obtained from a silicone resin adhesive, there is a risk of the distraction of optical isolators when they are handled.

The present inventors have examined various generation reasons of the bonding distortion, and found that a Faraday rotator mainly causes this distortion. Therefore, they conceived that a bonded surface for a substrate of a Faraday rotator in an optical element of an optical isolator is provided with a bond avoidance means, so that the degradation of optical characteristics due to a bonding distortion can be prevented, and they have investigated various conditions thoroughly so as to accomplish the present invention.

Figure 2:
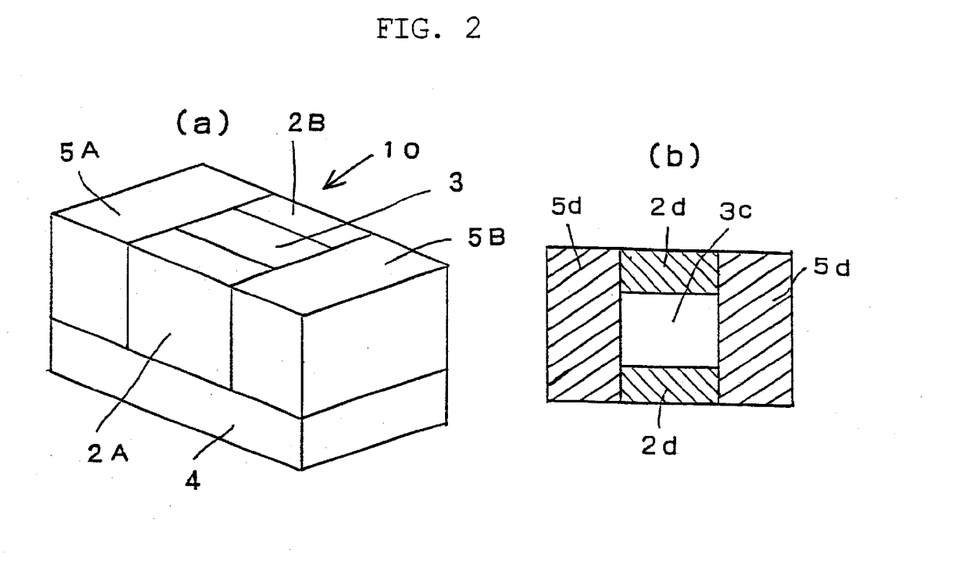
FIG. 2 includes explanatory views showing composed examples of the optical isolator according to the present invention that (a) is a perspective view and (b) is a sectional view, which shows a condition of a bonded surface for a substrate of an optical element and magnets.

FIG. 2(a) is an explanatory view showing another composed example of the optical isolator according to the present invention.

This optical isolator 10 comprises two of polarizers 2A and 2B fixed to each other with a relative angel of about 45° via a Faraday rotator 3 inserted between them, which has a Faraday rotation angle of about 45°, and thereby a rectangular parallelepiped optical element is formed. This isolator has an effect for passing through light of the forward direction but shielding light of the reverse direction.

As shown in FIG. 2(b), the optical isolator comprises an optical element, which is bonded and fixed to a bonded surface for the optical element of a substrate 4 (2d represents a bonded surface of a polarizer and 3c represents a bonded surface of a Faraday rotator), and rectangular parallelepiped permanent magnets 5A and 5B, which are bonded and fixed to each magnet bonded surface 5d.

In this case, it is preferable that each section of the polarizers 2A and 2B and Faraday rotator 3 has a rectangular shape, especially square shape, the Faraday rotator 3 with a Faraday rotation angle of about 45° is clamped between two of polarizers 2A and 2B to form the optical element, and then it is bonded and fixed with a synthetic resin adhesive, for example, a epoxy resin adhesive to a substrate center. If thermal resistance is required, the optical element is preferably bonded and fixed with a solder or sealing glass. A single crystal plate such as a bismuth-substituted rare-earth iron garnet panel is commonly used for the Faraday rotator 3.

Further, for example, an Sm-Co permanent magnet is used for magnets 5A and 5B, they are sintered and formed in rectangular parallelepiped, magnetized parallel with an optical axis, and bonded and fixed parallel with an optical axis to a peripheral portion of a level difference, which is located on a side of the Faraday rotator, and thereby a desired optical isolator 10 is formed. Furthermore, a resin adhesive such as an epoxy resin adhesive is also preferable to bond and fix magnets.

Machining a stainless steel SUS304 with high precision is used for a substrate. If the transparency is required, a quartz glass or GGG is used for a substrate.

Hereinafter, the most important composed feature of the optical isolator of the present invention will be explained.

The feature as shown in FIG. 2(b) is that a bond avoidance means 3c is provided so as not to be bonded the Faraday rotator in the optical element to the substrate.

First of all, as to a specific example of the bond avoidance means, a material, which repels an adhesive, is previously applied on a bonded surface for the substrate of the Faraday rotator or a bonded surface for the Faraday rotator of the substrate, so that a bonding distortion generated on the Faraday rotator can be avoided when the optical element is bonded and fixed to the substrate.

As described above, since a material, which repels an adhesive, is previously applied on a bonded surface for the substrate of the Faraday rotator as a bond avoidance means, if a bonding agent such as a solder or synthetic resin adhesive is applied on a bonded surface for the substrate of the optical element, the bonded surface for the substrate of the Faraday rotator repels the bonding agent, that is, not bonded to the substrate while the other surface of the optical element is firmly bonded to the substrate. As the results, the distortion for the optical element generated after it is bonded to the substrate can be solved and the degradation of the optical characteristics can be prevented.

As to a material, which repels a bonding agent, specifically, in the case where an alloy solder is used as the bonding agent, it is preferable to form a non-metallized layer on a side surface of the optical element. Besides, in the case where an epoxy resin adhesive is used as the bonding agent, it is preferable to form a fluorocarbon resin coating or the like.

Second, a space can be provided between the substrate and the bonded surface of the Faraday rotator as a bond avoidance means.

For example, as shown in FIG. 3(a), a substrate with a concave level difference 34 is formed by engraving a concave level difference on the bonded surface for the Faraday rotator of the substrate, and a space 33c, which is formed when the optical element is bonded to the substrate, is used as a bond avoidance means 3c. In this case, the bonded surface of the optical element, which is bonded with a bonding agent, is a polarizer bonded surface 32d.

Further, as shown in FIG. 3(b), a substrate with convex level differences 44, which is formed on two of bonded surfaces 42d for polarizers higher than the substrate surface, is formed. When the optical element is bonded to the substrate, a space 43c, which is formed between the substrate and bonded surface for the substrate of the Faraday rotator is used as a bond avoidance means 3c.

Third, as shown in FIG. 3(c), the bond avoidance means is formed by bonding the Faraday rotator 53 between the polarizers 52A and 52B in which an area of the light-transmitting surface of the Faraday rotator 53 is formed smaller than each area of the light-transmitting surfaces of the polarizers 52A and 52B, and they are bonded to form an optical element 51. When the optical element is bonded to the substrate, a space 53c is formed between the substrate and the bonded surface for the substrate of the Faraday rotator as a bond avoidance means 3c. In this case, the bonded surface of the optical element, which is bonded with a bonding agent, is the bonded surface for the substrate of the polarizers 52d.

According to above-described compositions, each space is provided between the substrate and the bonded surface for the substrate of the Faraday rotator, so that it can prevent the Faraday rotator from directly bonding to the substrate without any affection in terms of transmission of light such as laser. Therefore, the distortion for the optical element generated after it is bonded to the substrate can be solved while the bonding strength is maintained by the other bonded surface of the polarizer 52d, and the degradation of the optical characteristics can be avoided.

According to the above-described compositions, the optical isolator of the present invention can give the following influence and effect.

The bond avoidance means is provided so as not to be bonded only the bonded surface for the substrate of the Faraday rotator in the rectangular parallelepiped optical element to the substrate, and thereby the distortion for the optical element generated after it is bonded to the substrate can be solved, and the desired optical characteristics can be obtained. Further, there can be provided a reliable and low cost optical isolator which can be positioned easily with high precision, and the optical element can be bonded and fixed with sufficient bonding strength by the other bonded surface of the optical element except the Faraday rotator.

EXAMPLES

Hereafter, the present invention will be specifically explained with reference to the following examples and comparative examples of the present invention. However, the present invention is not limited thereto.

Example 1/Comparative Example 1

First, an optical isolator was manufactured. As a polarizer, two comprising polarizing glass of which each one surface was applied with non-reflective coating for air and each of the other surface was applied with non-reflective coating for adhesive were used. As a Faraday rotator, one comprising necessary magnetic field strength of 31 KA/m of which both surfaces were applied with non-reflective coatings for adhesives was used. And they are bonded through an adhesive in the face of each surface applied with non-reflective coatings for adhesives.

Then, polarized light was penetrated through the optical element, which was superposed in order of the polarizing glass, Faraday rotator, and polarizing glass, from the forward direction and the reverse direction respectively to adjust a angle of the superposition in magnetic field so that the forward direction insertion loss should be minimized and the reverse direction insertion loss should be maximized, and then they were bonded and fixed. This superposed optical element was cut off in a predetermined size, and the bonded optical element (1.3 mm in height×1.3 mm in width×1.4 mm in depth) was formed.

By utilizing this optical element, the optical isolators as described below were manufactured to find each optical characteristic.

In Example 1, in order to manufacture the optical isolators, magnets and optical element were bonded and fixed with various adhesives on each substrate surface in which a level difference is provided in both magnet bonded portion surfaces and optical element bonded portion surface. As to the substrate with a level difference, the level difference of 1.3 mm in width×1.6 mm in depth×0.2 mm in height was provided in the center of a tabular substrate of 3.5 mm in width×1.6 mm in length×0.5 mm in thickness. As to the magnet, it was a rectangular parallelepiped of 1.0 mm in width ×1.5 mm in depth×1.7 mm in height.

In Comparative Example 1, in order to manufacture the optical isolators, magnets and optical element were bonded and fixed with various adhesives on each surface of a conventional full-flat substrate (3.5 mm in width×1.6 mm in depth×0.7 mm in thickness), which had no level difference on bonded portion surfaces of both magnets and optical element.

10 samples were prepared for each example, measured each reverse direction insertion loss, inspected whether there was positional fault in each optical isolator or not, and conducted an impulse destructive test. The results were shown in table 1. Each test procedure and judging standard were as follows.

(a) Precision of bonding/fixing position of the optical isolator: Fixing precision for each setting position was within ±0.05 mm (±50 μm), and if the precision of the sample exceeded the above value, it was regarded as defective.

(b) Impulse destructive test: A 2000 G impulse test was conducted on each sample five times in six directions, and if the sample had no debonding in the optical element or magnet, it was regarded as acceptance criterion.

TABLE 1

| Example Nos. | Shape of substrate | Kind of adhesive of magnet bonded surface | Kind of adhesive on optical element bonded surface | Reverse direction insertion loss (dB) | Positional fault of optical element | Impulse destruction |
|---|---|---|---|---|---|---|
| Example 1-1 | With level difference | Epoxy | Silicone | 45.6 | 0 | 0 |
| Example 1-2 | With level difference | Epoxy | Epoxy | 39.8 | 0 | 0 |
| Example 1-3 | With level difference | Silicone | Silicone | 45.7 | 0 | 0 |
| Comparative Example 1-1 | Flat plate | Epoxy | Epoxy | 31.8 | 4 | 0 |
| Comparative Example 1-2 | Flat plate | Silicone | Silicone | 44.9 | 4 | 8 |
| Comparative Example 1-3 | Flat plate | Epoxy | Silicone | 34.5 | 7 | 3 |

As shown in table 1, it was found that the optical isolators, in which the optical element and magnets were bonded and fixed to the substrate with the level difference, obtained high optical characteristics, high precision in assembly, and sufficient bonding strength.

Example 2

The optical isolators were manufactured with the same conditions as Example 1 except the material of the Faraday rotator (its saturation magnetic field strength is 48 A/m), and the evaluation of the optical characteristics was conducted on the basis of penetrating a light through the positions of 2A-1, 2A-2, and 2A-3 of a polarizing glass 2A in FIG. 1.

Table 2 showed the measurement results of each reverse direction insertion loss. Judging from the results of table 2, it was found that if the light was penetrated through the position near the center of the magnetic field, a lack of magnetic field strength for the Faraday rotator was solved.

TABLE 2

| | Items | | |
|---|---|---|---|
| | Reverse direction insertion loss (dB) in each position of optical element | | |
| Example Nos. | 2A-1 | 2A-2 | 2A-3 |
| Example 2 | 44.8 | 45.6 | 30.5 |
| Example 3 | 44.8 | 45.5 | 44.5 |

Example 3

On the same condition as Example 2 except the height of the magnet (in this case, the height of the magnet was added 0.2 mm to it). In the case where the magnetic field strength of the light transmitting position 2A-3 of the optical element was set equal to the magnetic field strength of the light transmitting position 2A-1 of the optical element, each reverse direction insertion loss was measured, and the results were also shown in table 2. Judging from the results of table 2, it was found that the optical element was disposed on a magnet center in a height direction, so that a lack of magnetic field strength for the Faraday rotator was solved.

Examples 4–6, Comparative Example 2

First, an optical element was manufactured. As a polarizer, two comprising polarizing glass of which each one surface was applied with non-reflective coating for air and each of the other surface was applied with non-reflective coating for adhesive were used. As a Faraday rotator, one of which both surfaces were applied with non-reflective coatings for adhesives was used. And they are bonded through an adhesive in the face of each surface applied with non-reflective coatings for adhesives. Then, polarized light was penetrated through the optical element, which was superposed in order of the polarizing glass, Faraday rotator, and polarizing glass, from both a forward direction and reverse direction respectively to adjust an angle of the superposition in magnetic field so that the forward direction insertion loss should be minimized and the reverse direction insertion loss should be maximized, and then they were bonded and fixed. This superposed optical element was cut off in a predetermined size, and the bonded optical element was formed.

By utilizing this optical element, the optical isolators as follows were manufactured to find each optical characteristic.

In order to observe each bonding portion, a transparent substrate (quartz glass or GGG) was used for the substrate to be bonded the optical element and magnets. As a magnet, two Sm-Co permanent magnets were used.

In Example 4, in order to form a bond avoidance means, a repelling material was applied to the bonded surface for the substrate of the Faraday rotator. A fluorocarbon resin was used as the repelling material.

In Example 5, each optical isolator has a space provided between the bonded surface for the substrate of the Faraday rotator and the substrate. In Example 5-1, a substrate having a space of 0.3 mm in depth formed by a concave level difference on the bonded surface for the Faraday rotator of the substrate was used. In Example 5-2, a substrate having a space of 0.3 mm in depth formed by convex level differences, which were two of bonded surfaces for polarizers higher than the substrate surface, was used. In Example 5-3, a space of 0.1 mm in depth was formed by bonding an optical element, in which an area of the light-transmitting surface of the Faraday rotator was formed smaller than each area of the light-transmitting surfaces of the polarizers to a tabular substrate.

In Example 6, the optical isolator having a space formed by applying no synthetic resin adhesive on the bonded surface for the Faraday rotator in the substrate surface was used. In this case, the space was formed by a coating thickness of an epoxy resin adhesive.

In Comparative Example 2-1, an optical isolator formed by utilizing the optical element in which a whole area of the bonded surface for the substrate of the optical element, which naturally includes a bonded surface for the substrate of the Faraday rotator, was applied with an epoxy resin adhesive was used. In Comparative Example 2—2, the same composed optical isolator except an adhesive was used. In this case, a silicone resin adhesive was used as a boding agent.

Figure 3:
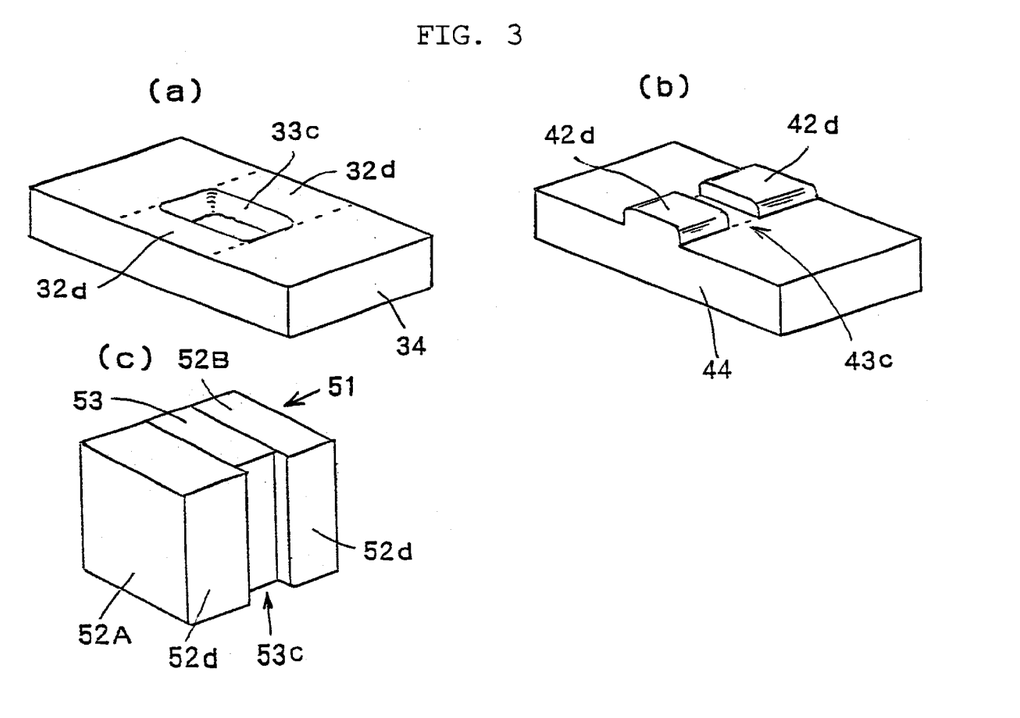
FIG. 3 includes explanatory views showing a bond avoidance means provided on a bonded surface for a substrate of a Faraday rotator in the optical isolator or on a substrate surface according to the present invention, for the case where: (a) a space as a bond avoidance means is formed by a concave level difference, (b) a space as a bond avoidance means is formed by a convex level difference and (c) a space is formed by shrinking an area of a light-transmitting surface of a Faraday rotator.

As to a substrate with a concave level difference as shown in Example 5-1 of FIG. 3(*a*), the level difference of 1.2 mm in width×0.5 mm in length×0.3 mm in depth was provided in the center of the flat plate of 2.3 mm in width×1.5 mm in length×0.5 mm in thickness. Further, as to the space disposed between convex level differences as shown in Example 5-2 of FIG. 3(*b*), the rectangular parallelepipeds of 1.2 mm in width ×0.5 mm in length×0.3 mm in height were disposed on bonded portions for polarizers to form the space of 1.2 mm in width×0.5 in length. The area of the light-transmitting surface of the Faraday rotator was 8.5% smaller than that of the polarizers.

10 samples were prepared for each example, measured each reverse direction insertion loss, inspected whether there was positional fault in each optical isolator or not, and conducted the impulse destructive test. The results were shown in table 3. Each test procedure and judging standard were as follows.

(a) The judging standard of the reverse direction insertion loss was≧38 dB.

(b) Impulse destructive test: After the measurement of optical characteristics, a 2000 G impulse test was conducted on each sample five times in six directions, and if the sample had no debonding of the optical element or magnets, it was regarded as acceptance criterion.

TABLE 3

| | | Items | | | |
|---|---|---|---|---|---|
| Example Nos. | With or without bond avoidance means for substrate of Faraday rotator | Kind of adhesive on optical element bonded surface | Reverse direction insertion loss (dB) | Impulse destruction | synthetic judgement |
| Example 4 | FIG.2(b): Apply repelling material | Epoxy | 44.7 | 0 | ○ |
| Example 5-1 | FIG.3(a): Space by concave level difference | Epoxy | 43.9 | 0 | ○ |
| Example 5-2 | FIG.3(b): Space by convex level difference | Epoxy | 44.6 | 0 | ○ |
| Example 5-3 | FIG.3(c): Space by shrinking | Epoxy | 45.3 | 0 | ○ |

TABLE 3-continued

| Example Nos. | With or without bond avoidance means for substrate of Faraday rotator | Kind of adhesive on optical element bonded surface | Reverse direction insertion loss (dB) | Impulse destruction | synthetic judgement |
|---|---|---|---|---|---|
| | light-transmitting surface | | | | |
| Example 6 | FIG.2(b): Apply no adhesive | Epoxy | 44.8 | 0 | ○ |
| Comparative Example 2-1 | No, FIG.4(b): Apply adhesive | Epoxy | 34.2 | 0 | x |
| Comparative Example 2-2 | No, FIG.4(b): Apply adhesive | Silicone | 45.2 | 5 | x |

As shown in table 3, each optical isolator, which was bonded and fixed to the substrate while the bond avoidance means was provided between the bonded surface for the substrate of the Faraday rotator and the substrate surface, can avoid a bonding distortion, and obtain high optical characteristics and sufficient bonding strength.

The present invention is not limited to the embodiments described above. The above-described embodiments are mere examples, and those having the substantially same composition as that described in the appended claims and providing the similar functions and advantages are included in the scope of the present invention.

What is claimed is:

1. An optical isolator, wherein on one side of an optical element comprising at least one polarizer and at least one Faraday rotator, said optical element is bonded and fixed to a bonded portion surface of a substrate in which a height of the bonded portion surface has a level difference between a peripheral portion and central portion.

2. The optical isolator according to claim 1, wherein a magnet or strength reinforcement material is disposed on a peripheral portion of the substrate at the level difference from the peripheral portions of the substrate so as to reinforce strength of the optical element.

3. The optical isolator according to claim 1, wherein said optical element is bonded and fixed with at least a silicone resin adhesive.

4. The optical isolator according to claim 2, wherein said optical element is bonded and fixed with at least a silicone resin adhesive.

5. An optical isolator, wherein an optical element comprising at least one polarizer and at least one Faraday rotator, said optical element is bonded and fixed with a bonding agent so a substrate, said substrate including a bond avoidance means for bonding said polarizer to said substrate without bonding said Faraday rotator to said substrate.

6. The optical isolator according to claim 5, wherein the bond avoidance means is a material, which repel a bonding agent.

7. The optical isolator according to claim 5, wherein the bond avoidance means is a space provided between the substrate and the Faraday rotator.

8. The optical isolator according to claim 6, wherein the bond avoidance means is a space provided between the substrate and the Faraday rotator.

9. The optical isolator according to claim 5, wherein the bond avoidance means is formed by bonding the Faraday rotator to the polarizer in which an area of the light-transmitting surface of the Faraday rotator is formed smaller than an area of the light-transmitting surfaces of the polarizer.

10. The optical isolator according to claim 6, wherein said bond avoidance means is formed by bonding the Faraday rotator to the polarizer in which an area of the light-transmitting surface of the Faraday rotator is formed smaller than each area of the light-transmitting surfaces of the polarizers.

11. The optical isolator according to claim 7, wherein the bond avoidance means is formed by bonding the Faraday rotator to the polarizer in which an area of the light-transmitting surface of the Faraday rotator is formed smaller than each area of the light-transmitting surfaces of the polarizers.

12. The optical isolator according to claim 8, wherein said bond avoidance means is formed by bonding the Faraday rotator to the polarizer in which an area of the light-transmitting surface of the Faraday rotator is formed smaller than each area of the light-transmitting surfaces of the polarizers.

13. The optical isolator according to claim 5, wherein said bond avoidance means is formed by a metallize for soldering, which is formed on the side portion of the optical element except that of the Faraday rotator, and soldering the substrate.

14. The optical isolator according to claim 6, wherein said bond avoidance means is formed by a metallize for soldering, which is formed on the side portion of the optical element except that of the Faraday rotator, and soldering the substrate.

15. The optical isolator according to claim 7, wherein said bond avoidance means is formed by a metallize for soldering, which is formed on the side portion of the optical element except that of the Faraday rotator, and soldering the substrate.

16. The optical isolator according to claim 8, wherein said bond avoidance means is formed by a metallize for soldering, which is formed on the side portion of the optical element except that of the Faraday rotator, and soldering the substrate.

17. The optical isolator according to claim 9, wherein said bond avoidance means is formed by a metallize for soldering, which is formed on the side portion of the optical element except that of the Faraday rotator, and soldering the substrate.

18. The optical isolator according to claim 10, wherein said bond avoidance means is formed by a metallize for soldering, which is formed on the side portion of the optical element except that of the Faraday rotator, and soldering the substrate.

19. The optical isolator according to claim 11, wherein said bond avoidance means is formed by a metallize for soldering, which is formed on the side portion of the optical element except that of the Faraday rotator, and soldering the substrate.

20. The optical isolator according to claim 12, wherein said bond avoidance means is formed by a metallize for soldering, which is formed on the side portion of the optical element except that of the Faraday rotator, and soldering the substrate.

* * * * *